United States Patent [19]

Imoto et al.

[11] Patent Number: 4,619,229

[45] Date of Patent: Oct. 28, 1986

[54] STRUCTURE FOR COMBUSTION CHAMBER OF AUXILIARY CHAMBER TYPE INTERNAL COMBUSTION ENGINE

[75] Inventors: Koji Imoto; Mataji Tateishi; Noriyasu Inenaga; Tadao Omura, all of Nagasaki; Hideyuki Ishikawa; Sumio Harada, both of Tokyo; Yuhiko Kiyota, Kyoto; Hiroyuki Kobayashi, Kyoto; Koichi Nakanishi, Kyoto; Satoru Kume, Kyoto, all of Japan

[73] Assignees: Mitsubishi Jukogyo Kabushiki Kaisha; Mitsubishi Jidosha Kogyo Kabushiki Kaisha, both of Japan

[21] Appl. No.: 691,751

[22] Filed: Jan. 15, 1985

[30] Foreign Application Priority Data

Jan. 21, 1984 [JP] Japan .................................. 59-7943

[51] Int. Cl.$^4$ .......................................................... F02B 3/00
[52] U.S. Cl. .................................. 123/286; 123/269; 123/259
[58] Field of Search .......................... 123/286, 269, 259

[56] References Cited

U.S. PATENT DOCUMENTS

| | | | |
|---|---|---|---|
| 1,917,883 | 7/1933 | Goldberg | 123/286 |
| 2,795,215 | 6/1957 | Holt | 123/286 |
| 3,259,116 | 7/1966 | Bricout | 123/286 |
| 4,122,805 | 10/1978 | Kingsbury | 123/286 |
| 4,186,692 | 2/1980 | Kawamura | 123/286 |
| 4,329,956 | 5/1982 | Burgio | 123/286 |
| 4,434,758 | 3/1984 | Grammes | 123/286 |
| 4,440,125 | 4/1984 | Case | 123/286 |

FOREIGN PATENT DOCUMENTS

| | | | |
|---|---|---|---|
| 883106 | 6/1943 | France | 123/286 |
| 425908 | 10/1947 | Italy | 123/286 |
| 57-140516 | 8/1982 | Japan | 123/286 |
| 58-51215 | 3/1983 | Japan | 123/286 |

Primary Examiner—Ronald B. Cox
Attorney, Agent, or Firm—Wenderoth, Lind & Ponack

[57] ABSTRACT

An auxiliary chamber injection port providing communication between a main combustion chamber and an auxiliary combustion chamber has its axis composed of a combination of a straight line and an arc in a manner to satisfy the following relationships: $\theta_1 < \theta_2$; $20° \leq \theta_1 \leq 45°$; and $35° \leq \theta_2 \leq 67.5°$, if the outflow angle of the axis of said auxiliary chamber injection port at the open end at the side of said auxiliary combustion chamber is designated at $\theta_2$ with respect to a plane normal to the center line of said auxiliary combustion chamber and if the outflow angle of the axis of said auxiliary chamber injection port at the open end at the side of said main combustion chamber with respect to a plane normal to the center line of said auxiliary combustion chamber is designated at $\theta_1$.

5 Claims, 19 Drawing Figures

FIG. 1.
(PRIOR ART)
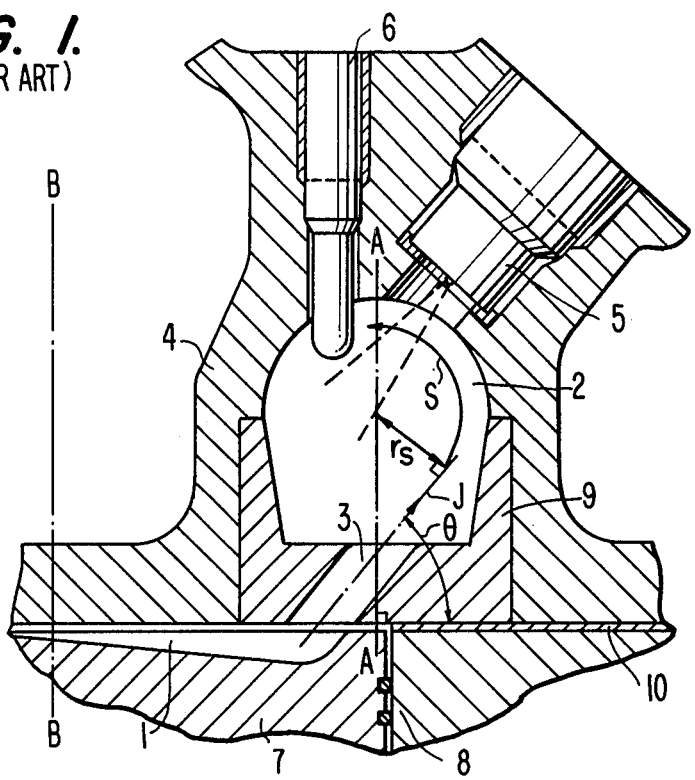
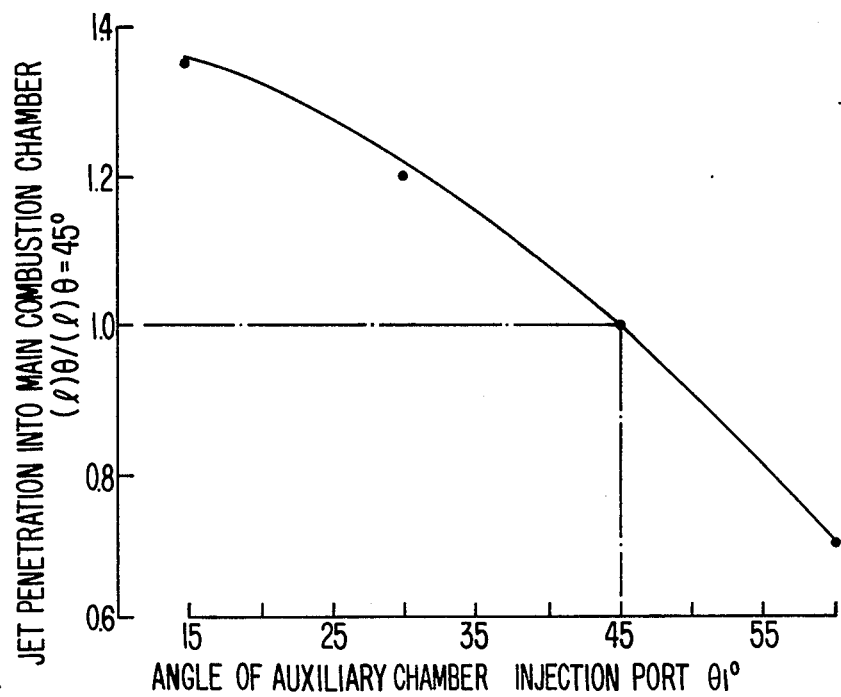
FIG. 2.

FLOW IN AUXILIARY CHAMBER

JET FLOW INTO MAIN CHAMBER

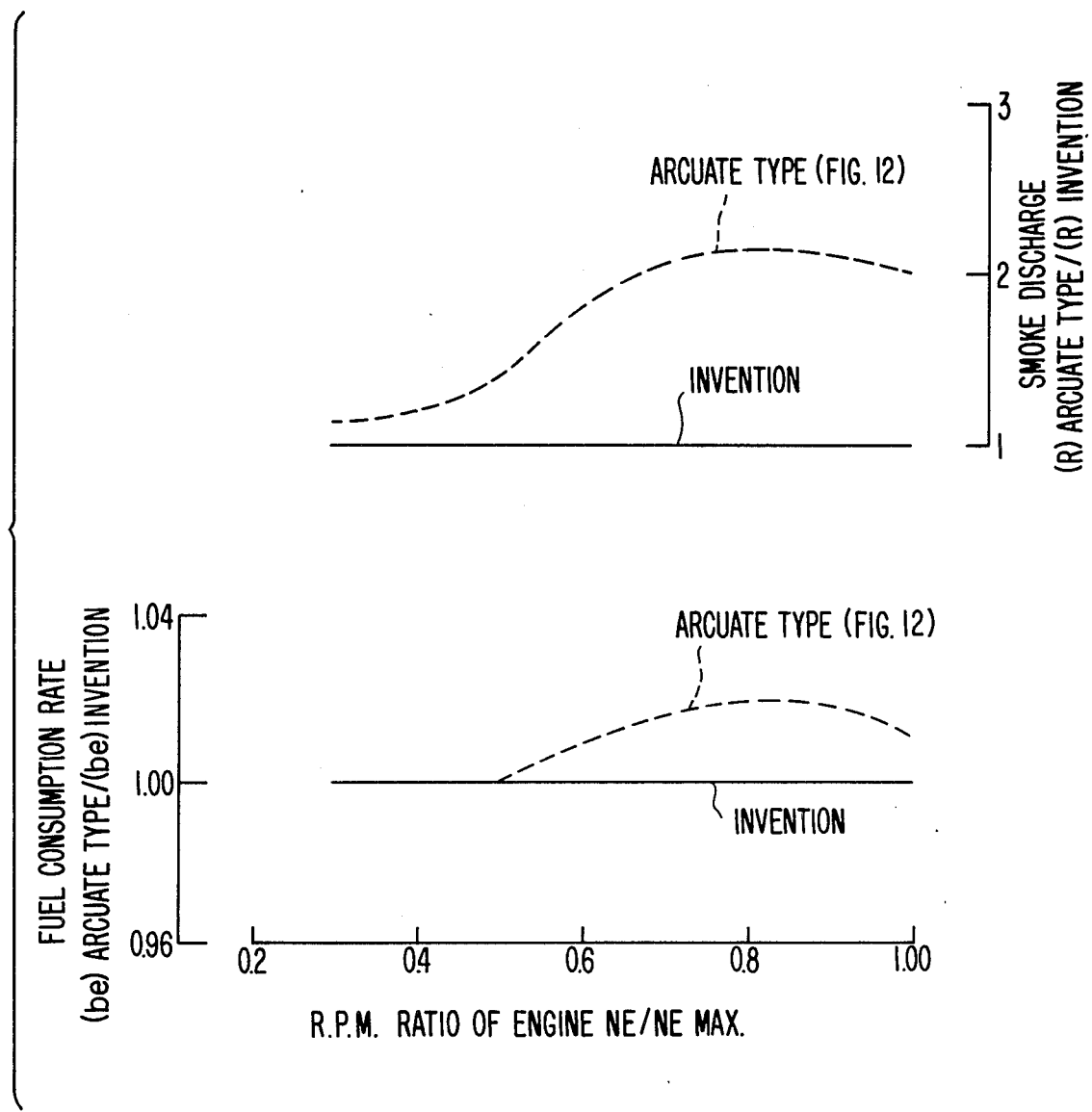

STRUCTURE FOR COMBUSTION CHAMBER OF AUXILIARY CHAMBER TYPE INTERNAL COMBUSTION ENGINE

BACKGROUND OF THE INVENTION

1. Field of the Invention

The present invention relates to an auxiliary chamber type internal combustion engine and, more particularly, to a structure for the combustion chamber of the auxiliary chamber type internal combustion engine. 2. Description of the Prior Art One example of the combustion chamber of a swirl chamber type Diesel engine of the prior art is shown in FIG. 1. As shown, an auxiliary combustion chamber 2 is formed by recessing a cylinder head 4. Specifically, the auxiliary combustion chamber 2 is formed of the recess in the cylinder head 4 and an auxiliary chamber plug 9 which is fitted in that recess from the lower side of the cylinder head 4. The plug 9 is fixed in the cylinder head 4 and between the cylinder head 4 and a cylinder 8 through a cylinder head gasket 10. Moreover, the lower faces of the auxiliary chamber plug 9 and the cylinder head 4 extend in a common plane.

The auxiliary combustion chamber 2 has its upper portion formed into a semispherical shape and its lower portion formed into a frusto-conical shape, a cylindrical shape or the like. FIG. 1 shows the auxiliary combustion chamber 2 having a lower portion of the frusto-conical shape. The auxiliary combustion chamber 2 is arranged, if necessary, with a fuel injection valve 5 and a glow plug 6 for preheating the inside of the auxiliary combustion chamber 2 at the start of the engine. The auxiliary combustion chamber 2 has communication through an auxiliary chamber injection port 3 with a main combustion chamber 1 which is defined by the top face of a piston 7, the inner face of the cylinder 8 and the lower face of the cylinder head 4. The auxiliary chamber injection port 3 is formed wholly or mostly in the auxiliary chamber plug 9. The former case is shown in FIG. 1. As shown, moreover, the auxiliary chamber injection port 3 has a straight axis and is at a constant angle $\theta$ to a perpendicular to the axis of the auxiliary combustion A—A.

At the compression stroke of the engine, the air in the combustion chamber 1 is compressed by the piston 7 to flow through the auxiliary chamber injection port 3 into the auxiliary combustion chamber 2 thereby to generate a swirl S. When fuel is injected from the fuel injection valve 5 along that swirl S, it is swirled in the auxiliary combustion chamber 2 by the swirl S so that it is mixed with the air and ignited and burned. The mixing of the unburned fuel, which is injected from the auxiliary combustion chamber 2, with the air in the main combustion chamber 1 is undergone by the gas jet from the auxiliary combustion chamber 2. The jet spurting from the auxiliary combustion chamber 2 arrives to impinge upon the cylinder wall diametrically opposed to the auxiliary combustion chamber 2 with respect to a cylinder center line B—B. After this impingement, the fuel is scattered along the surface of the cylinder wall.

However, the aforementioned structure of the prior art has the following defects.

In order to improve formation and combustion of the air-fuel mixture in the main combustion chamber 1, the jet has to reach the aforementioned cylinder wall for a short time period. In the case of a small-sized swirl chamber type Diesel engine, generally speaking, the arrangement of intake and exhaust valves and so on raises a structural limit in that the auxiliary chamber is formed close to the cylinder center line B—B. Because of this limit, the auxiliary chamber injection port 3 has its effective area reduced to increase the jet velocity so that its throttle loss and the heat loss in the main combustion chamber are high.

As is apparent from the experimental results (in which measured values are indicated by solid circles) of the jet characteristics in the main combustion chamber of the auxiliary chamber type engine, as shown in FIG. 2, the effective area of the auxiliary chamber injection port 3 can be enlarged because the jet penetration into the main combustion chamber 1 is increased for a small auxiliary chamber injection port angle $\theta$.

If, however, this angle $\theta$ is reduced in such a straight auxiliary chamber injection port 3 of the prior art as is shown in FIGS. 1 and 3, the angular difference of $(180-\theta)°$ between the direction of the swirl in the auxiliary combustion chamber 2 and the direction of the gas jet into the main combustion chamber 1 becomes large in the gas jet from the auxiliary combustion chamber 2 into the main combustion chamber 1 at the expansion stroke, as is apparent from the experimental results (in which measured values are indicated by solid circles) of the flow coefficient of the auxiliary chamber injection port, as shown in FIGS. 4(a) to (c). This makes it difficult for the gas to flow into the main combustion chamber 1 (as a result of a reduction in the auxiliary chamber injection port flow coefficient) to remarkably enlarge the throttle loss of the auxiliary chamber injection port or the flow coefficient of the auxiliary injection port thereby to invite instability. The latter phenomenon that the auxiliary chamber injection port flow coefficient is remarkably enlarged is caused mainly because the effective area F of the open end of the auxiliary chamber injection port 3 at the side of the auxiliary chamber is remarkably increased if the auxiliary chamber injection port angle $\theta$ is small, as shown in FIGS. 4(a) to (c).

FIG. 5 is a sectional view showing another example of the prior art. As shown, an open end of the auxiliary chamber injection port 3 at the side of the auxiliary combustion chamber is located at the side of the cylinder center line B—B with respect to an auxiliary combustion chamber center line A—A. Moreover, the outflow angle $\theta_1$ of the open end of the auxiliary chamber injection port 3 at the side of the main combustion chamber 1 is made smaller than the outflow angle $\theta_2$ of the open end of the auxiliary chamber injection port 3 at the side of the auxiliary combustion chamber 2.

When the fuel injection nozzle 5 is disposed in the position of FIG. 3, a swirling radius $r_s$ in the auxiliary chamber is small in a case where the outflow angle $\theta_2$ is small, as indicated by broken lines in FIG. 5, or the swirling direction of the swirl in the auxiliary chamber and the fuel injection direction are reversed, as indicated by solid lines in FIG. 5, to degrade the mixing of the fuel with the air and the combustion of the mixture in the auxiliary combustion chamber 2.

This problem is solved if the fuel injection nozzle 5 is positioned, as shown in FIG. 5, and if the auxiliary chamber injection port 3 is so formed as is shown by the solid lines. Despite this fact, however, the difference of $\Delta\theta(=\theta_1-\theta_2)$ between the auxiliary chamber injection port angles at the sides of the auxiliary combustion chamber 2 and the main combustion chamber 1 becomes large. As a result, the flow loss is increased, as shown in FIG. 6, to weaken the swirl in the auxiliary combustion chamber 2 and to drop the velocity of the jet in the main combustion chamber 1 so that the mixing of the fuel with the air and the combustion of the fuel are degraded. In this case, moreover, the structure of the cylinder head has to be modified so much that the production cost is raised.

Turning to FIG. 7, there is shown a structure in which the auxiliary chamber injection port 3 is positioned such that its opening at the side of the auxiliary combustion chamber 2 is formed oppositely of the cylinder center line B—B with respect to the auxiliary combustion chamber center line A—A, such that the outflow angle $\theta_2$ at the open end of the auxiliary chamber injection port 3 at the side of the auxiliary combustion chamber 2 is made larger than the outflow angle $\theta_1$ at the open end of the same auxiliary chamber injection port 3 at the side of the main combustion chamber, and such that the opening of the same auxiliary chamber injection port 3 at the side of the main combustion chamber is formed in the side face of the auxiliary chamber plug 9, and in which the cylinder head 4 has its lower face reamed to form a part of the auxiliary chamber injection port 3. Of the auxiliary injection ports 3 of FIG. 7, one having an outflow angle $\theta_2 > 90°$ at its open end at the side of the auxiliary combustion chamber 2 is shown by broken lines, whereas the other having the same angle $\theta_2 < 90°$ is shown by solid lines. From the structural requirement of the aforementioned auxiliary chamber injection port 3, the outflow angle $\theta_1$ at the open end at the side of the main combustion chamber 1 has to be made very small whereas the same outflow angle $\theta_2$ at the side of the auxiliary combustion chamber 2 has to be made very large. Moreover, the axis of the auxiliary chamber injection port 3 is substantially bent. This makes it impossible to expect much improvement in the mixing of the fuel with the air and the combustion of the fuel because the flow loss in the auxiliary chamber injection port 3 is increased which weakens the swirl in the auxiliary combustion chamber 2 and drops the velocity of the jet in the main combustion chamber 1. For the aforementioned case of $\theta_2 > 90°$, moreover, the swirling radius $r_s$ of the swirl in the auxiliary chamber becomes small so that the intensity of the swirl in the auxiliary combustion chamber 2 is reduced which degrades the mixing of the fuel with the air and the combustion of the fuel. From the structural requirement of the auxiliary chamber injection port 3 and the lower face of the cylinder head 4, still moreover, their parts have to be modified so much that the production cost is raised and that a problem arises in degradation in the durability of the auxiliary chamber plug 9.

SUMMARY OF THE INVENTION

In view of this background, therefore, it is an object of the present invention to provide a structure for an auxiliary chamber injection port which is designed to ensure a swirl in an auxiliary combustion chamber 2, to facilitate gas outflow from the auxiliary combustion chamber 2 into a main combustion chamber 1 and to improve a jet penetration into the main combustion chamber 1 so that the throttle loss in the auxiliary chamber injection port 3 may be reduced to improve the mixing of the fuel with the air and the combustion of the fuel in the main combustion chamber 1. The structure of the present invention is characterized in that the outflow angle $\theta_1$ between the center axis of the open end of the auxiliary chamber injection port at the side of the main combustion chamber and a plane normal to the center axis of the auxiliary combustion chamber is made smaller than the outflow angle $\theta_2$ between the center axis of the open end of the auxiliary chamber injection port at the side of the auxiliary combustion chamber and a plane normal to the center axis of the auxiliary combustion chamber, and in that the axis of the auxiliary chamber injection port is so formed by combining two straight lines and an arc as to satisfy relationships of $20° \leq \theta_1 \leq 45°$ and $35° \leq \theta_2 \leq 67.5°$.

BRIEF DESCRIPTION OF THE DRAWINGS

Other objects, features and advantages of the present invention will be described in the following description with reference to the accompanying drawings, in which:

FIG. 1 is a sectional view showing the structure of the combustion chamber of the swirl chamber type engine of the prior art;

FIG. 2 is a diagram showing the jet penetration into the main combustion chamber and the durability of the edge portion of the open end at the side of the main combustion chamber;

FIG. 13 is a diagram showing the smoke discharge and the fuel consumption rate;

DESCRIPTION OF THE PREFERRED EMBODIMENTS

The present invention will be described in the following in connection with the embodiments thereof with reference to the accompanying drawings.

Figure 8:
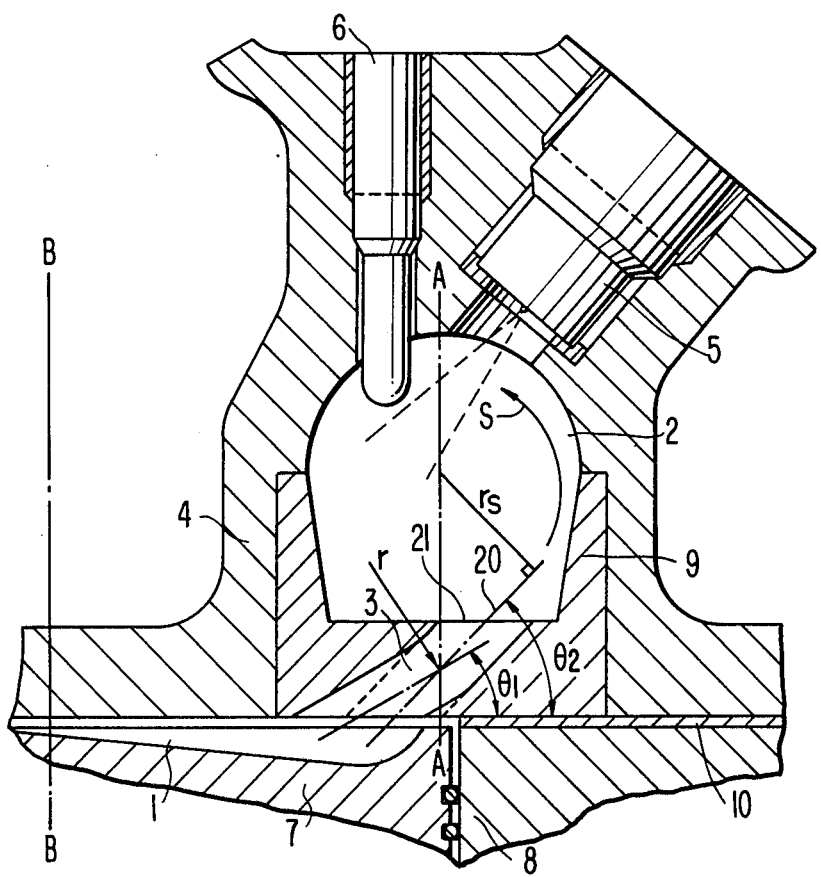
FIG. 8 is a sectional view showing the structure of a combustion chamber according to a first embodiment of the present invention.
Figure 9:
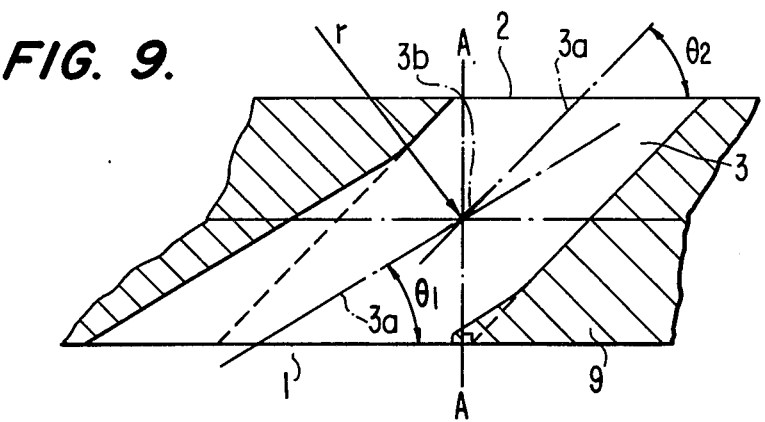
FIG. 9 is a sectional view showing the auxiliary chamber injection port of FIG. 8 in an enlarged scale.

FIG. 8 is a sectional view showing a combustion chamber according to a first embodiment of the present invention, and FIG. 9 is a sectional view showing the auxiliary chamber injection port of FIG. 8 in an enlarged scale.

As shown, an auxiliary combustion chamber 2 is formed by recessing a cylinder head 4. Specifically, the auxiliary combustion chamber 2 is formed of the recess in the cylinder head 4 and an auxiliary chamber plug 9 which is fitted in that recess from the lower side of the cylinder head 4. The plug 9 is fixed in the cylinder head 4 and between the cylinder head 4 and a cylinder 8 through or without a cylinder head gasket 10 (FIG. 8 shows the case with the cylinder gasket 10). Moreover, the lower faces of the auxiliary chamber plug 9 and the cylinder head 4 extend in a common plane.

The auxiliary combustion chamber 2 has its upper portion formed into a semispherical shape and its lower portion formed into a frusto-conical shape, a cylindrical shape or the like. FIG. 8 shows the auxiliary combustion chamber 2 having a lower portion of the frusto-conical shape. The auxiliary combustion chamber 2 is arranged, if necessary, with a fuel injection valve 5 and a glow plug 6 for preheating the inside of the auxiliary combustion chamber 2 at the start of the engine. The auxiliary combustion chamber 2 has communication through an auxiliary chamber injection port 3 with a main combustion chamber 1 which is defined by the top face of a piston 7, the inner face of the cylinder 8 and the lower face of the cylinder head 4. The auxiliary chamber injection port 3 is formed wholly in the auxiliary chamber plug 9. The aforementioned auxiliary chamber injection port 3 is determined such that its opening at the side of the auxiliary combustion chamber 2 is formed to contain the auxiliary combustion chamber center line A—A or to be positioned oppositely of the cylinder center line B—B with respect to the auxiliary combustion chamber center line A—A. FIG. 8 shows the former formation. The open end of the auxiliary chamber injection port 3 at the side of the main combustion chamber 1 is opened wholly in the lower face of the aforementioned auxiliary chamber plug 9.

If the outflow angle of the axis of the aforementioned auxiliary chamber injection port 3 at the open end at the side of the main combustion chamber 1 is designated at $\theta_1$ with respect to a plane normal to the auxiliary combustion chamber center line A—A and if the outflow angle of the axis of the same auxiliary chamber injection port 3 at the open end at the side of the auxiliary combustion chamber 2 with respect to a plane normal to the aforementioned auxiliary combustion chamber center line A—A is designated at $\theta_2$, the former angle $\theta_1$ is made smaller than the latter angle $\theta_2$, and the following relationships hold: $20° \leq \theta_1 \leq 45°$; and $35° \leq \theta_2 \leq 67.5°$ (or preferably $35° \leq \theta_2 \leq 45°$; and $34° \leq \theta_2 \leq 67.5°$ (or preferably $35° \leq \theta_2 \leq 55°$). Moreover, the aforementioned angular difference is set such that $\Delta\theta(=\theta_2-\theta_1)\leq 22.5°$.

The relationships of the auxiliary chamber injection port angles thus defined are put into practice by forming the axis of the auxiliary chamber injection port 3 of a combination of two straight lines 3a and one arc 3b, as shown in FIG. 9. Specifically, the axis of the auxiliary chamber injection port 3 is composed of the two straight lines 3a at the sides of the auxiliary and main combustion chambers and the arc 3b forming the joining portion (which is located generally at the center of the axis) of the two.

The operations and effects of the above-specified structure will be described in the following.

Figure 3:
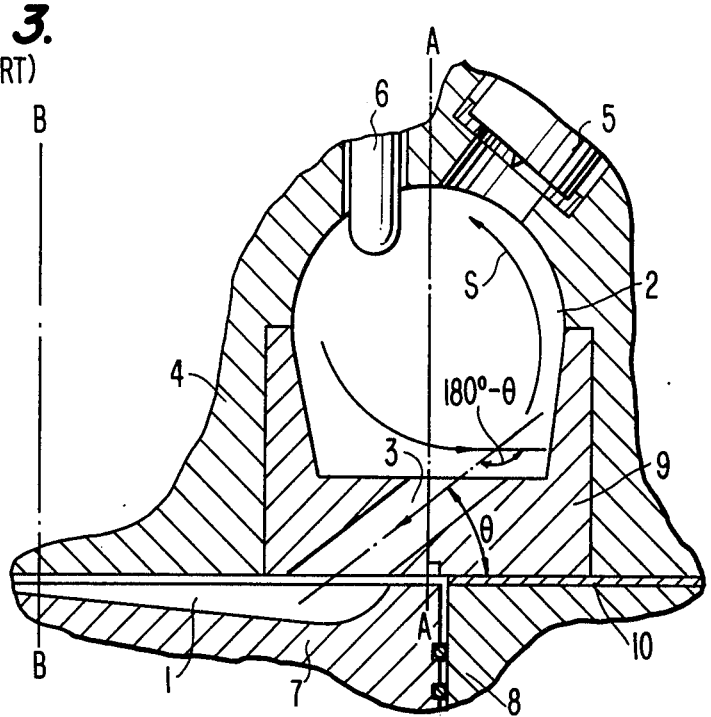
FIG. 3 is an explanatory view showing the outflow state of the gas from the auxiliary combustion chamber into the main combustion chamber.
Figure 4A:
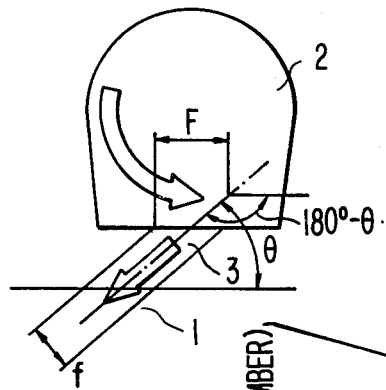
FIG. 4(a) is an explanatory view showing the area of the injection port at the open end.
Figure 4B:
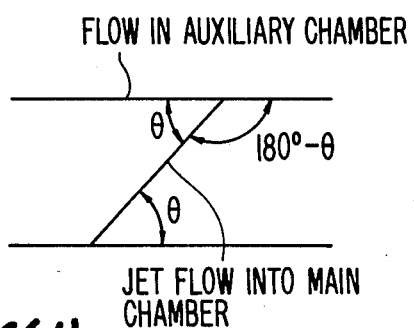
FIG. 4(b) is an explanatory view showing the flow in the auxiliary chamber and the jet flow into the main chamber.
Figure 4D:
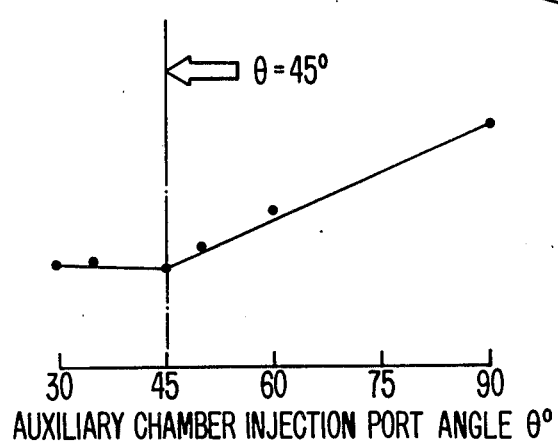
FIG. 4(d) is a diagram showing the auxiliary chamber injection port flow coefficient (from the main chamber to the auxiliary chamber)
Figure 6:
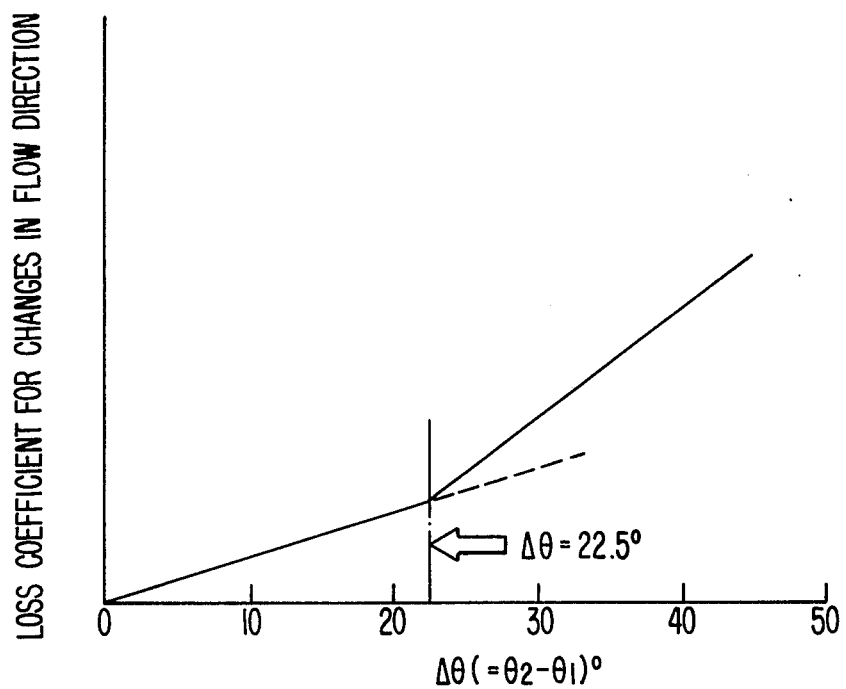
FIG. 6 is a diagram showing the loss coefficient for changes in the flow direction.
Figure 7:
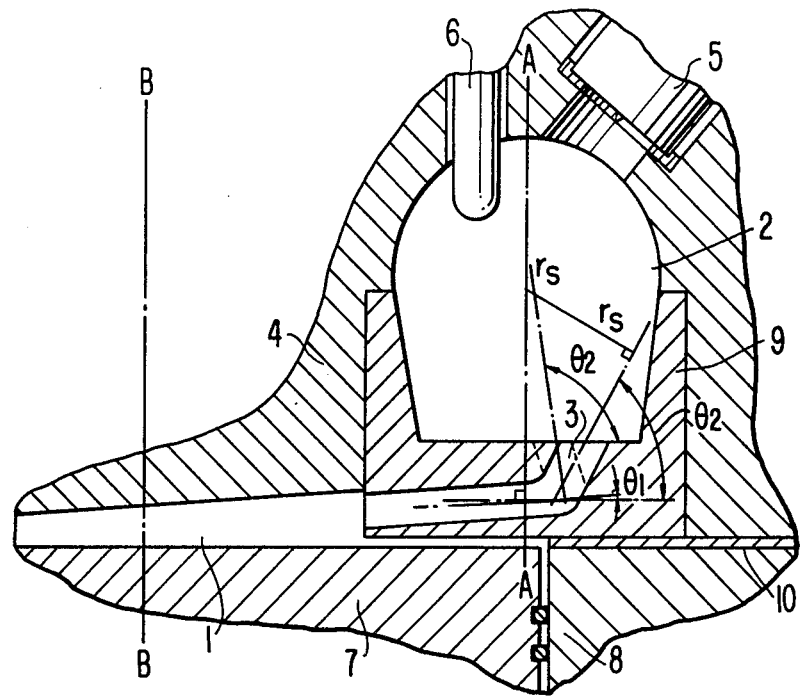
FIG. 7 is a sectional view showing another example of the structure of the combustion chamber of the prior art.

With the structure of the auxiliary chamber injection port according to the present invention, the flow coefficient $C_{al}$ of the auxiliary chamber injection port is small when the gas in the main combustion chamber 1 is caused to flow into the auxiliary combustion chamber 2 as a result of compressing the gas in the main combustion chamber 1 by the piston 7 because the injection port angle $\theta$ at the side of the main combustion chamber is equal to or smaller than 45° (whereas the auxiliary chamber injection port flow coefficient $C_{al}$ becomes large for $\theta_1 \geq 45°$, as shown in FIG. 4(d), so that the gas flow velocity is high). Because the auxiliary chamber injection port 3 has the arcuate shape at its portion where the flow direction changes from $\theta_1$ to $\theta_2$ and because of the angular difference $\Delta\theta=\theta_2-\theta_1$ 22.5°, moreover, the flow loss, i.e., the attenuation of the flow can be reduced, as shown in FIG. 6. IN addition, the open end position and the injection port angle $\theta_2$ ($35° \leq \theta_2 \leq 67.5°$) of the auxiliary chamber injection port 3 at the side of the auxiliary combustion chamber and the swirling radius $r_s$ of the swirl in the auxiliary chamber can be determined at proper values so that an intense swirl can be established in the auxiliary combustion chamber 2 to promote the mixing of fuel and the air and the resultant combustion.

Figure 4C:
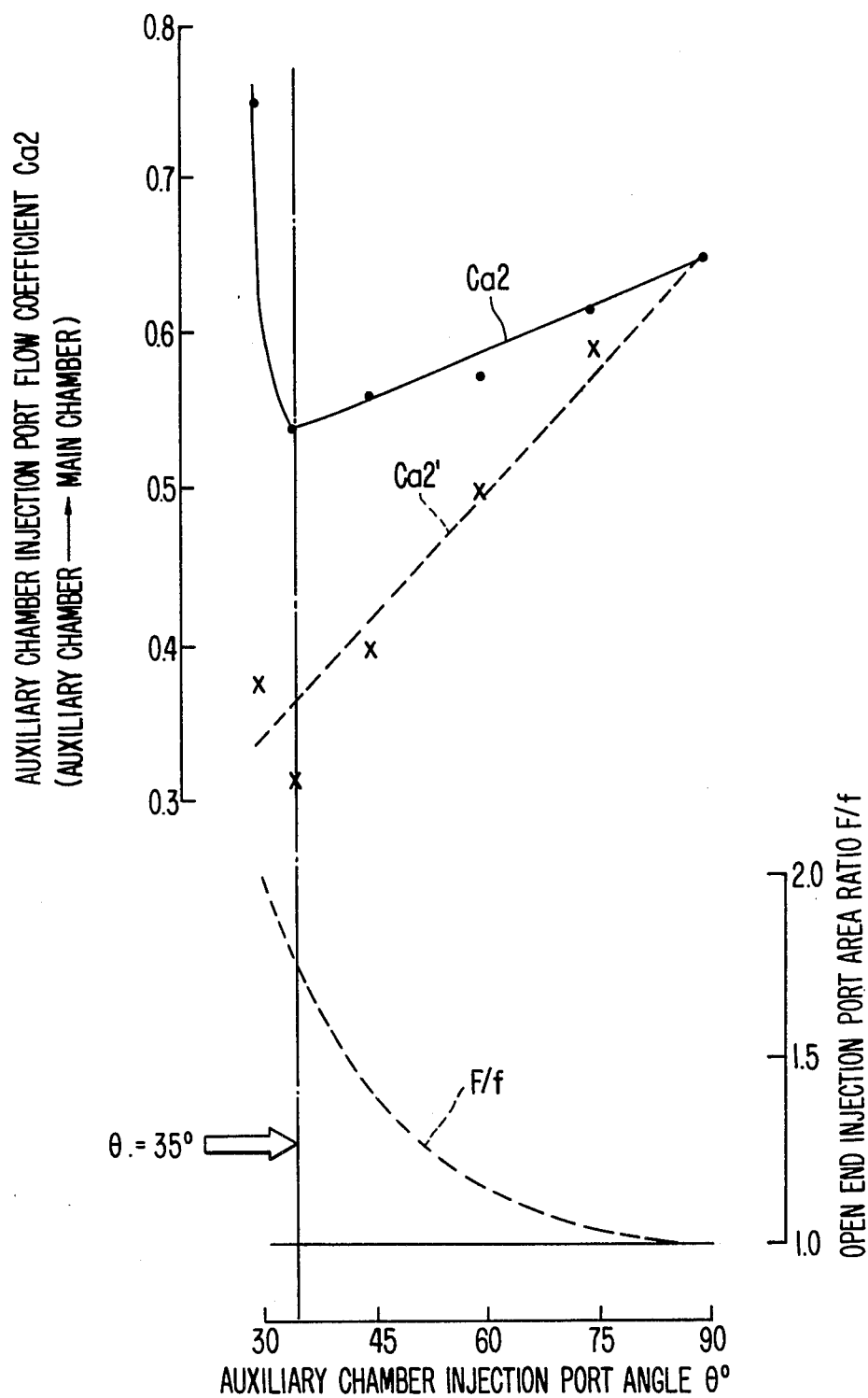
FIG. 4(c) is a diagram showing the auxiliary chamber injection port flow coefficient (from the auxiliary chamber to the main chamber) and the area ratio of the injection ports at the open ends.
Figure 5:
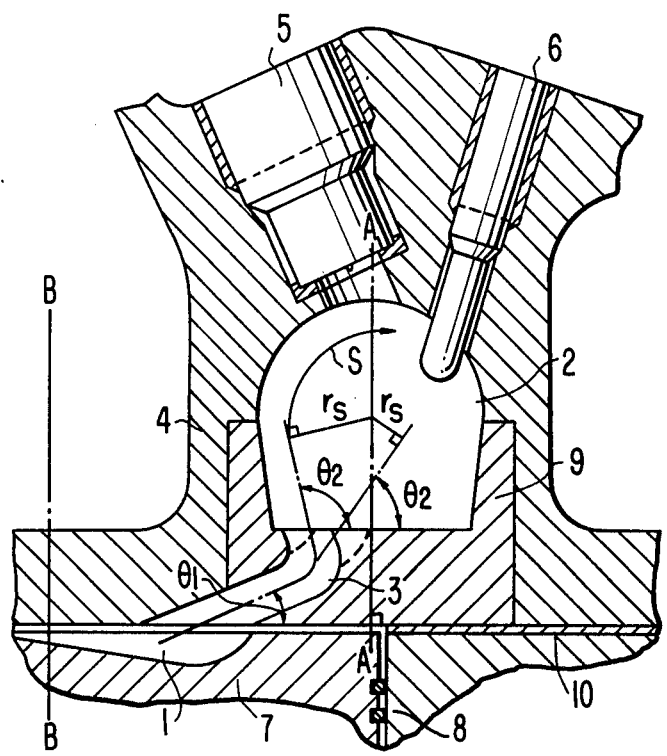
FIG. 5 is a sectional view showing one example of the structure of the combustion chamber.

When the angle $\theta_2$ of the auxiliary chamber injection port 3 at the side of the auxiliary combustion chamber is larger than the angle $\theta_1$ at the side of the main combustion chamber, furthermore, the outflow of the gas from the auxiliary combustion chamber 2 into the main combustion chamber 1 at the expansion stroke can be facilitated. At the same time, for the aforementioned angle $\theta_2 \geq 35°$, the flow characteristics through the auxiliary chamber injection port are stabilized, as shown in FIGS. 4(a) to (c). When the aforementioned angle $\theta_1$ of the auxiliary chamber injection port 3 is smaller than the other angle $\theta_2$, furthermore, the penetration of the jet into the main combustion chamber 1 is improved, as shown in FIG. 2, to promote the mixing and combustion of the unburned fuel with the air so that the effective area of the auxiliary chamber injection port 3 can be enlarged. As the aforementioned angle $\theta_1$ becomes smaller, the jet penetration into the main combustion chamber 1 is increased more (at a gradually decreasing rate . For the angle $\theta_1<20°$, however, there arises a problem in the durability of the auxiliary chamber plug 9, i.e., in that the edge portion of the open end of the auxiliary chamber injection port 3 at the main combustion chamber side is fused or cracked. Therefore, the angle $\theta_1$ is set to be equal to or larger than 20°. Furthermore, the effects of the aforementioned angles $\theta_1$ and $\theta_2$ are clarified because the axes of the auxiliary chamber injection port 3 are made straight at both the main and auxiliary combustion chamber sides.

Figure 10A:
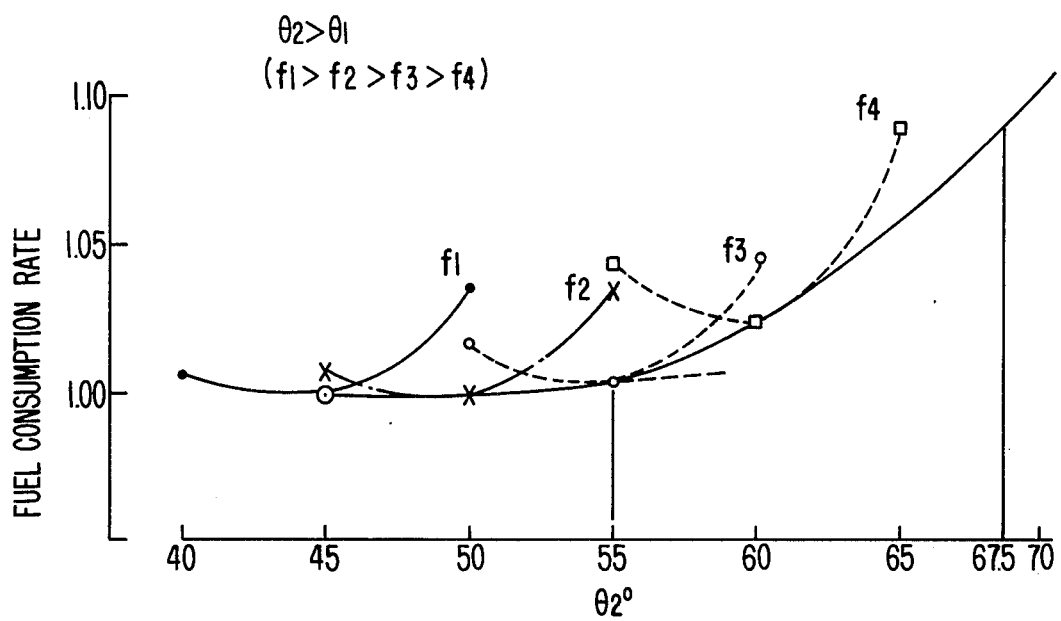
FIG. 10(a) is a diagram showing the influences of the angle of the auxiliary chamber injection port upon the fuel consumption rate.

FIG. 10(a) shows the influences of the angle $\theta_2$ at the auxiliary combustion chamber side upon the fuel consumption rate for the angular relationship of $\theta_2 > \theta_1$ Reference letters $f_i$ (i=1 to 4) indicate the effective area of the auxiliary chamber injection port. For the angle $\theta_2 \leq 55°$, the fuel consumption rate is excellent. For the angle $\theta_2 > 55°$, on the contrary, the fuel consumption rate is rather degraded. However, no practical problem arises for the angle $\theta_2$ up to 67.5°.

Figure 10B:
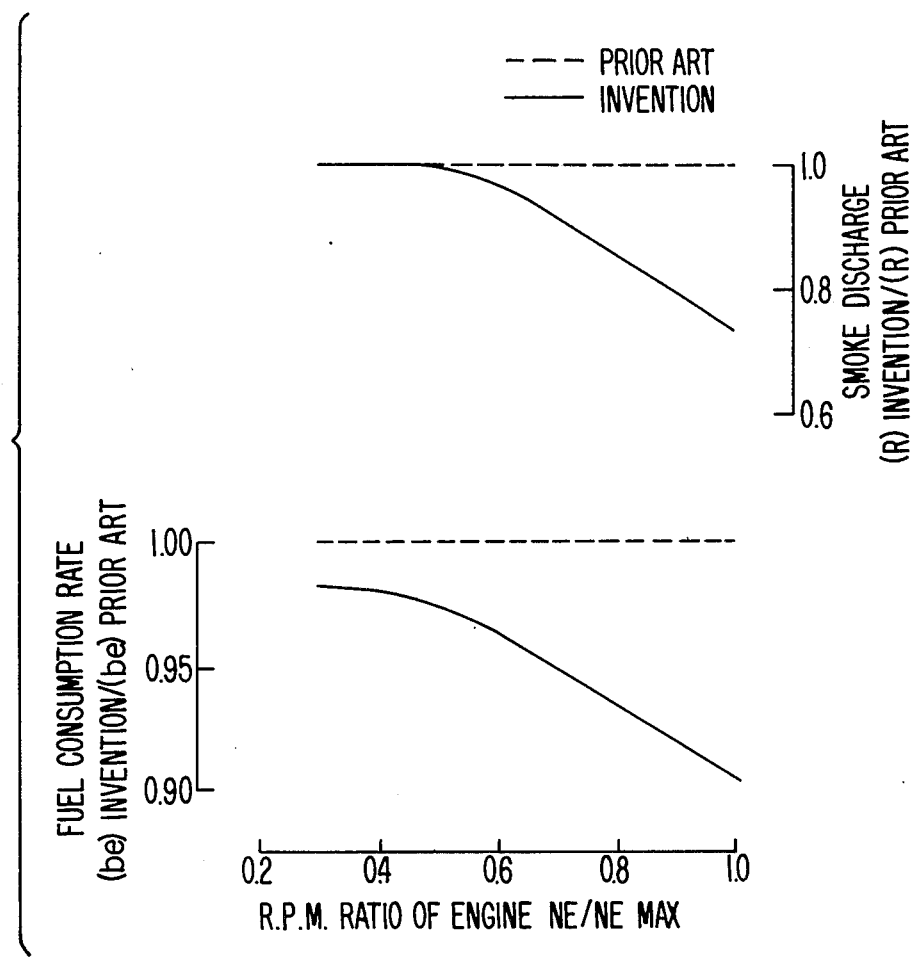
FIG. 10(b) is a diagram showing the smoke discharge and the fuel consumption rate.

By constructing the auxiliary chamber injection port 3 according to the present invention, as has been described hereinbefore, it is possible to promote the combustions in the main and auxiliary combustion chambers 1 and 2 and to reduce the throttle loss in the auxiliary chamber injection port 3 and the heat loss in the combustion chambers. This makes it possible to improve the fuel consumption rate and the smoke discharge (as shown as one example in FIG. 10(b)), to reduce the noises of the engine and the emissions of $NO_x$ and HC and to improve the speed and startability of the engine. Moreover, the structure of the present invention is excellent in the production cost and in the durability because the auxiliary chamber injection port 3 is formed in the auxiliary chamber plug 9 and because the remaining combustion chamber structure is simple.

Figure 11:
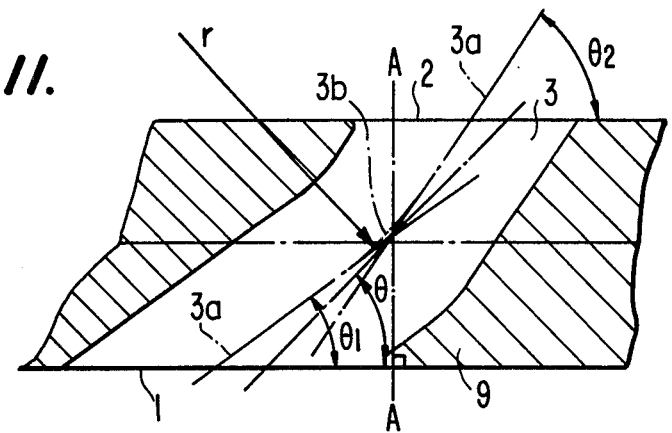
FIG. 11 is a sectional view showing the structure of the auxiliary chamber injection port according to a second embodiment of the present invention.

FIG. 11 is a sectional view showing an auxiliary chamber injection port according to a second embodiment of the present invention.

As shown, the outflow angle $\theta_1$ of the axis of the auxiliary chamber injection port 3 at the open end at the side of the main combustion chamber 1 and the outflow angle $\theta_2$ of the same axis at the open end at the side of the auxiliary combustion chamber 2 are set to satisfy $\theta_1 < \theta < \theta_2$ with respect to the injection port angle $\theta$ of the auxiliary chamber injection port 3 of the prior art (which has a straight axis). The remaining structure is similar to that of the first embodiment. Moreover, the operations and effects are also similar to those of the first embodiment.

Figure 12:
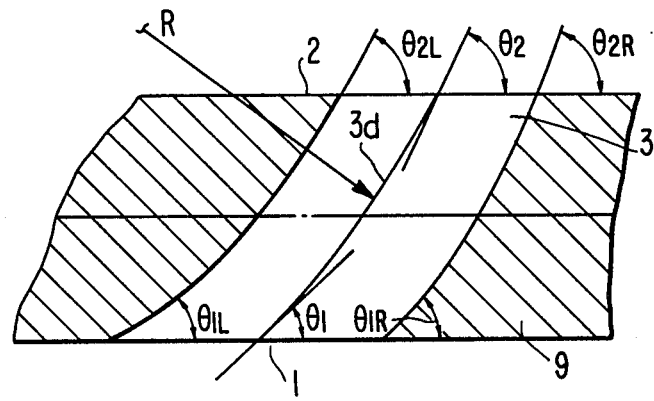
FIG. 12 is an enlarged sectional view showing the structure of an auxiliary chamber injection port having an arcuate axis.

Incidentally, let the case be considered, in which the auxiliary chamber injection port 3 has an arcuate axis 3d in the first and second embodiments. FIG. 12 is a sectional view showing the auxiliary chamber injection port.

In the present case, the angular relationships of the axis of the auxiliary chamber injection port 3 at the open ends at the main and auxiliary combustion chamber sides can also hold; $\theta_1 < \theta_2$; $20° \leq \theta_1 \leq 45°$; $37.5° \leq \theta_2 67.5°$; and $\Delta\theta(=\theta_2-\theta_1) \leq 22.5°$. However, the following problems arise so that both the fuel consumption rate and the smoke discharge become worse than those of the auxiliary chamber injection port 3, as shown in FIG. 13. That is to say, there are the following problems in the case of the arcuate axis shown in FIG. 12:

(1) Because the angle of the axis 3d of the auxiliary chamber injection port 3 gradually changed from the value $\theta_1$ at the open end of the main combustion chamber side to the value $\theta_2$ at the open end of the auxiliary combustion chamber, it is impossible to expect the effects as high as those obtainable from the auxiliary chamber injection port angles $\theta_1$ and $\theta_2$ of the present invention (in which both the axes of the auxiliary chamber injection port 3 are straight at the main and auxiliary combustion chamber sides).

(2) Because an angle $\sigma_{2L}$, i.e., a factor determining the outflow of the gas from the auxiliary combustion chamber 2 into the main combustion chamber 1 is smaller than the angle $\theta_2$, the gas is reluctant to flow out. Since another angle $\theta_{1R}$ is larger than the angle $\theta_1$, on the other hand, the jet penetration into the main combustion chamber 1 is dropped. That is to say $\theta_1 < \theta_2$; $\theta_{1L} < \theta_1 < O_{1R}$; and $\theta_{2L} < \theta_{2L} < \theta_2 < \theta_{2R}$.

In view of the above discussion, the structure in which the axis of the auxiliary chamber injection port 3 is made arcuate is excluded from the scope of the present invention.

Figure 14:
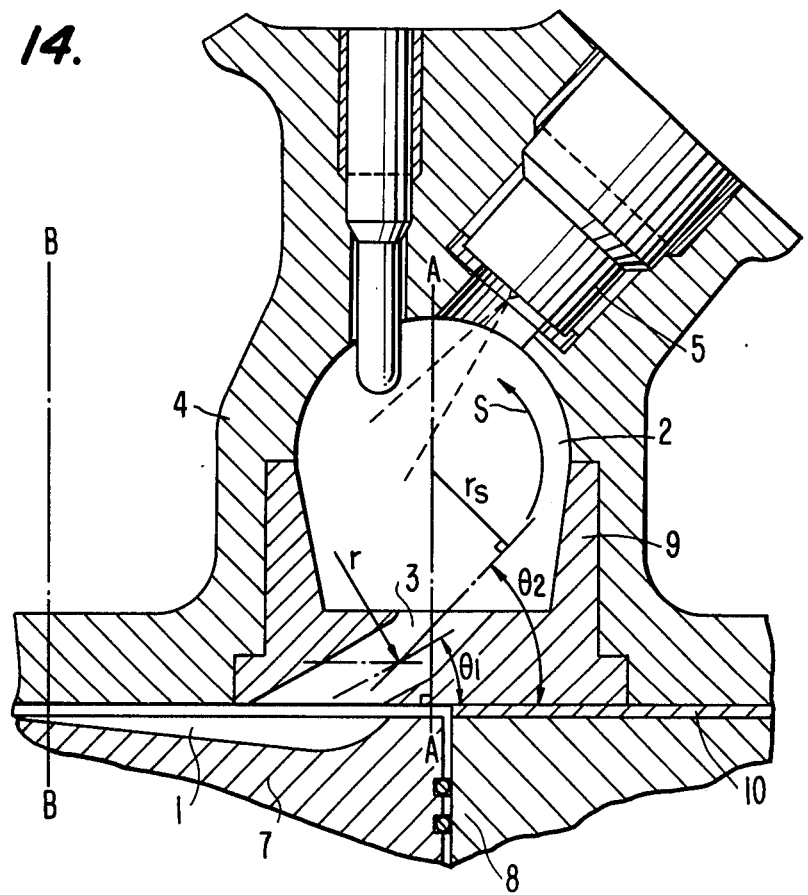
FIG. 14 is a sectional view showing the structure of a combustion chamber according to a third embodiment of the present invention.

FIG. 14 is a sectional view showing the structure of a combustion chamber according to a third embodiment of the present invention.

In this embodiment, by forming the lower portion of the auxiliary chamber plug 9 with a bulge (or a flange), the auxiliary chamber injection port 3 is formed in its entirety in the auxiliary chamber plug 9. The remaining structure is similar to that of the foregoing first and second embodiments.

At the same time, the operations and effects are also similar to those of the first and second embodiments.

Figure 15:
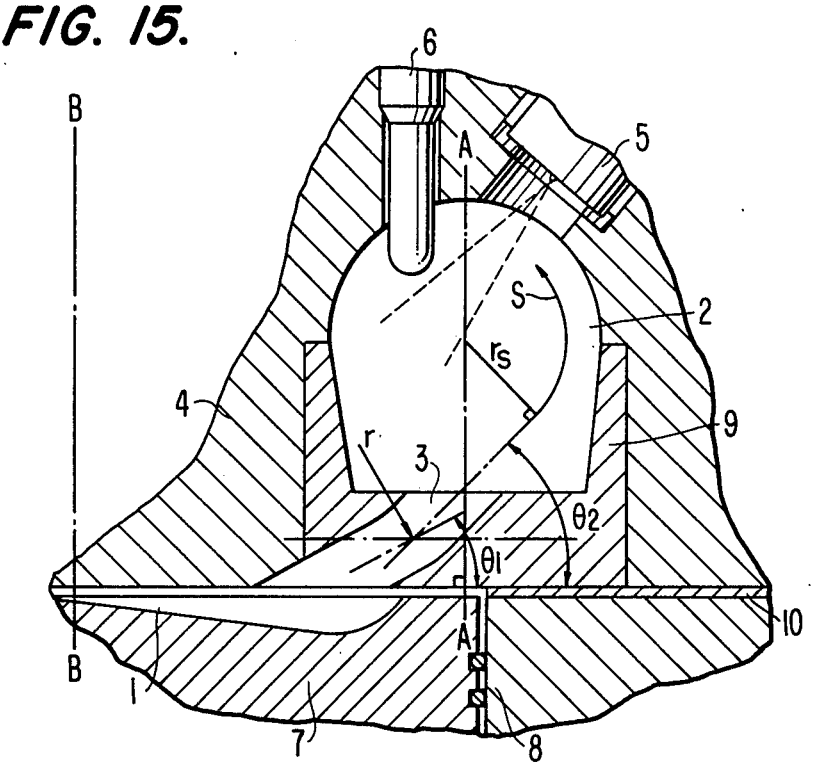
FIG. 15 is a sectional view showing the structure of a combustion chamber according to a fourth embodiment of the present invention.

FIG. 15 is a sectional view showing the structure of a combustion chamber according to a fourth embodiment of the present invention.

The auxiliary chamber injection port 3 is mostly formed in the auxiliary chamber plug 9, and most of the open end of the same auxiliary chamber injection port 3 at the side of the main combustion chamber 1 is opened in the lower face of the aforementioned auxiliary chamber plug 9. The remaining structure is similar to that of the first and second embodiments.

The operations and effects in this case are substantially similar to those of the first and second embodiments. However, the production cost is raised by the additional working of the lower face of the cylinder head 4.

Incidentally, the aforementioned auxiliary chamber injection port 3 has its section formed into a rectangular, square, elliptical, circular shape or the like.

What is claimed is:

1. In a structure for a combustion chamber of an auxiliary chamber type internal combustion engine, including:
   a main combustion chamber;
   an auxiliary combustion chamber; and
   an auxiliary chamber injection port providing communication between said main combustion chamber and said auxiliary combustion chamber, the open end of said auxiliary injection port at the side of said main combustion chamber being formed wholly or mostly in a lower surface of an auxiliary chamber plug,
   the improvement comprising wherein said auxiliary chamber injection port has a central axis oriented with respect to a center axis of said auxiliary combustion chamber which satisfies the following relationships:

$\theta_1 < \theta_2$;

$20° \leq \theta_1 \leq 45°$; and $35° \leq \theta_2 \leq 67.5°$, wherein the outflow angle of said central axis of said auxiliary chamber injection port at the open end at the side of said auxiliary combustion chamber is designated as $\theta_2$ with respect to a plane normal to said center axis of said auxiliary combustion chamber and wherein the outflow angle of said central axis of said auxiliary chamber injection port at the open end at the side of said main combustion chamber with respect to said plane normal to said center axis of said auxiliary combustion chamber is designated as $\theta_1$.

2. A structure according to claim 1, wherein said auxiliary chamber injection port has a section formed into a quadrilateral shape selected from the group consisting of a rectangular shape and a square shape.

3. A structure according to claim 1, wherein said auxiliary chamber injection port has a section formed into an elliptical shape.

4. A structure according to claim 1, wherein said auxiliary chamber injection port has a section formed into a shape selected from the group consisting of a circular shape and an oval shape.

5. A structure according to claim 1, wherein the axis of said auxiliary chamber injection port is composed of a combination of two straight lines at the sides of said main combustion chamber and said auxiliary combustion chamber and one arc joining said two straight lines.

* * * * *